A. C. BEARDSLEE.
Pressure Gage.

No. 69,894.

Patented Oct. 15, 1867.

Witnesses
J. W. Coombs
Geo. Reed

Inventor
Abraham C. Beardslee

United States Patent Office.

ABRAHAM C. BEARDSLEE, OF BROOKLYN, NEW YORK.

Letters Patent No. 69,894, dated October 15, 1867.

IMPROVEMENT IN APPARATUS FOR PROVING GAS PIPES.

*The Schedule referred to in these Letters Patent and making part of the same.*

TO ALL WHOM IT MAY CONCERN:

Be it known that I, ABRAHAM C. BEARDSLEE, of Brooklyn, in the county of Kings, and State of New York, have invented a certain new and useful Improvement on Proving Apparatus for Gas Pipes, of which the following is a full, clear, and exact description, reference being had to the accompanying drawing, forming part of this specification, and in which—

Figure 1:
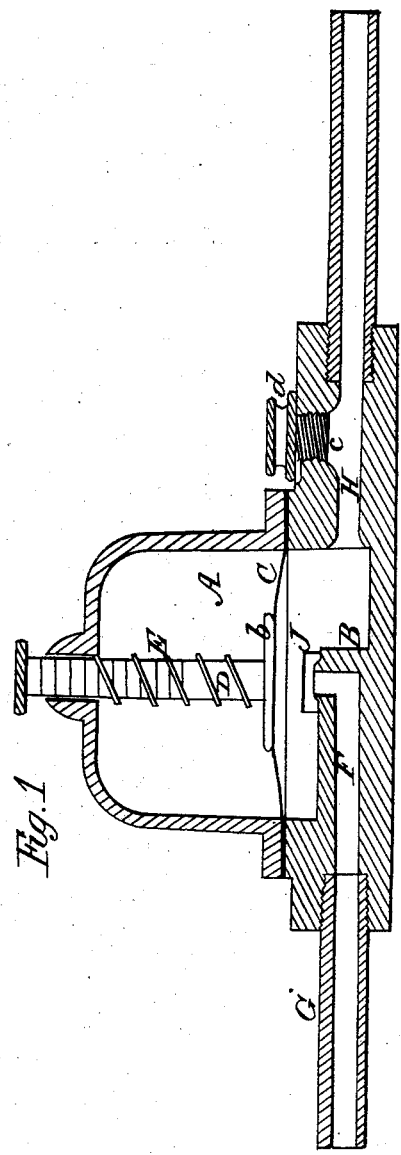
Figure 2:
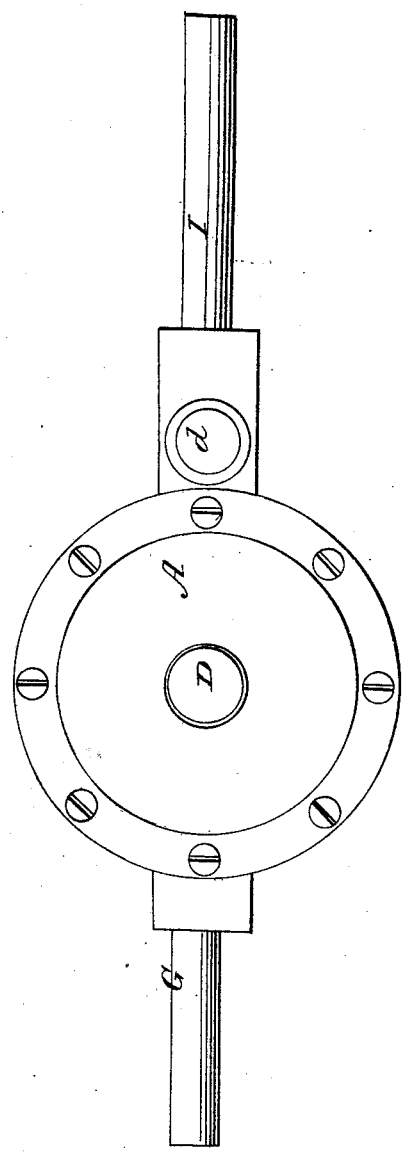

Figure 1 represents a vertical section of an apparatus constructed according to my improvement, and
Figure 2 a plan of the same.
Like letters indicate corresponding parts in both figures.

In the introduction of gas into buildings, it is customary, before letting on the gas, to prove the pipes and their connections, as to their tightness or freedom from leakage. This is usually done by pumping or compressing air into the pipes, and allowing such to stand therein for a certain period of time, a mercurial column or gauge being connected with the pipes, which the compressed air acting upon, raises to a certain point or limit, any depression or deviation from which, at the expiration of the time of proof, shows the amount of, if any, leakage, after which ether, or other agent more fine or subtle than air, and more or less odorous, is introduced to detect the precise place or places and amount of leakage.

My improvement obviates the use of a mercurial column or gauge, which is in many respects objectionable, and embraces important features, including a novel arrangement of ether-box and pressure-diaphragm with indicator-rod and check-valve, that constitutes an entirety or purely mechanical apparatus, which may be readily attached and detached without liability to breakage or to getting out of order, and that will accurately test the tightness of the pipe Referring to the accompanying drawing, A represents a bell or vessel, which is bolted or otherwise suitably secured to a base-piece, B, holding in between them an India-rubber or other flexible and close or tight diaphragm, C, which has resting upon it or connected with it, say, by means of a plate, $b$, a graduated rod, D, that projects through the upper end of the bell. Round this rod may be arranged a spiral spring, E, to secure the necessary resistance to the diaphragm against pressure from beneath, or the spring may be otherwise applied. The base-piece B is provided with a passage, F, to the outer end of which the air-pump for forcing in the air is or may be attached by a pipe, G, while the opposite end of said base-piece has a passage, H, which may connect either directly or by means of a pipe, I, and any suitable coupling, with the pipe or pipes which it is required to prove. J is a check-valve, covering the inner end of the passage F, to shut off escape of the compressed air on detaching the air-pump, or to prevent escape of ether or other volatile and odorous agent afterwards introduced to complete the test and detect the place or places of leakage, and which may be inserted into an ether-box, $c$, formed in part by the passage H, and a screw-plug or cap, $d$, the removal of which allows of the insertion of the ether without opening or interfering with the vessel A. The lines or marks on the graduated rod D serve to indicate the pressure on the pipes after pumping in the air, by the extent to which said rod is raised against the force of its spring, and accordingly as such rod, with the diaphragm, is depressed by leakage, the amount or extent of the latter.

What I claim as my invention, and desire to secure by Letters Patent, is—

1. The combination of the bell A, base-piece B, with its passages F H, diaphragm C, spring-borne graduated rod D, and check-valve J, all for operation together, substantially as and for the purpose herein set forth.

2. The arrangement, in connection with a diaphragm-indicator substantially of the character specified, of an ether-box, essentially as and for the purpose or purposes herein set forth.

ABRAHAM C. BEARDSLEE.

Witnesses:
J. W. COOMBS,
G. W. REED.